United States Patent
Zhang et al.

(10) Patent No.: US 10,346,063 B2
(45) Date of Patent: Jul. 9, 2019

(54) MAINTAINING QUORUM OF STORAGE OBJECTS IN NESTED LEVELS OF A DISTRIBUTED STORAGE SYSTEM

(71) Applicant: VMware, Inc., Palo Alto, CA (US)

(72) Inventors: Jin Zhang, Fremont, CA (US); Radhika Vullikanti, Foster City, CA (US); Gopala Suryanarayana, Fremont, CA (US); Varun Shah, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 70 days.

(21) Appl. No.: 15/356,413

(22) Filed: Nov. 18, 2016

(65) Prior Publication Data

US 2018/0143773 A1   May 24, 2018

(51) Int. Cl.
```
G06F 11/00    (2006.01)
G06F 3/06     (2006.01)
G06F 11/18    (2006.01)
G06F 11/20    (2006.01)
```

(52) U.S. Cl.
CPC ............ *G06F 3/0619* (2013.01); *G06F 3/067* (2013.01); *G06F 3/0631* (2013.01); *G06F 3/0644* (2013.01); *G06F 3/0664* (2013.01); *G06F 11/183* (2013.01); *G06F 11/187* (2013.01); *G06F 11/2056* (2013.01)

(58) Field of Classification Search
CPC .... G06F 3/0619; G06F 3/0631; G06F 3/0644; G06F 3/0664; G06F 3/067; G06F 11/183; G06F 11/187; G06F 11/2056
See application file for complete search history.

(56) References Cited

U.S. PATENT DOCUMENTS

| | | | | |
|---|---|---|---|---|
| 8,443,231 | B2 * | 5/2013 | Abraham | G06F 11/1425 709/220 |
| 9,639,437 | B2 * | 5/2017 | Hildebrand | G06F 11/201 |
| 2008/0184061 | A1 * | 7/2008 | Tripathi | G06F 11/1482 714/4.1 |
| 2011/0179231 | A1 * | 7/2011 | Roush | G06F 3/0622 711/152 |
| 2015/0082302 | A1 * | 3/2015 | Cheng | G06F 9/45533 718/1 |

OTHER PUBLICATIONS

S. Jajodia and David Mutchler. 1990. Dynamic voting algorithms for maintaining the consistency of a replicated database. ACM Trans. Database Syst. 15, 2 (Jun. 1990), 230-280 (Year: 1990).*
David K. Gifford. 1979. Weighted voting for replicated data. In Proceedings of the seventh ACM symposium on Operating systems principles (SOSP '79). ACM, New York, NY, USA, 150-162. (Year: 1979).*

* cited by examiner

*Primary Examiner* — Jason B Bryan
(74) *Attorney, Agent, or Firm* — Fish & Richardson P.C.

(57) ABSTRACT

Exemplary methods, apparatuses, and systems determine that quorum can be maintained for a storage object in a distributed storage system in the event a defined maximum number of first partitions in a first level of storage and a second partitions in a second level of storage fail. When it is determined that there are insufficient numbers of first partitions and/or second partitions, additional first partitions and/or second partitions are associated with the storage object in the distributed storage system. A number of votes is calculated for distribution and an allocation is defined for assigning the votes to each component and witness component of the storage object.

20 Claims, 7 Drawing Sheets

MAINTAINING QUORUM OF STORAGE OBJECTS IN NESTED LEVELS OF A DISTRIBUTED STORAGE SYSTEM

FIELD OF THE INVENTION

The various embodiments described in this document relate to the management of storage object components stored on storage devices in a distributed storage system.

BACKGROUND OF THE INVENTION

In a distributed storage system, a given storage object is composed of copies on multiple storage devices. Typically, a storage object can be accessed if there is a quorum of the copies that are alive. When one or more storage devices become slow or fails, problems can occur for accessing the storage object if there are copies on the slow or failing storage devices. This can result in the storage object becoming inaccessible due to a loss of quorum, effectively creating data loss issues.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 4:
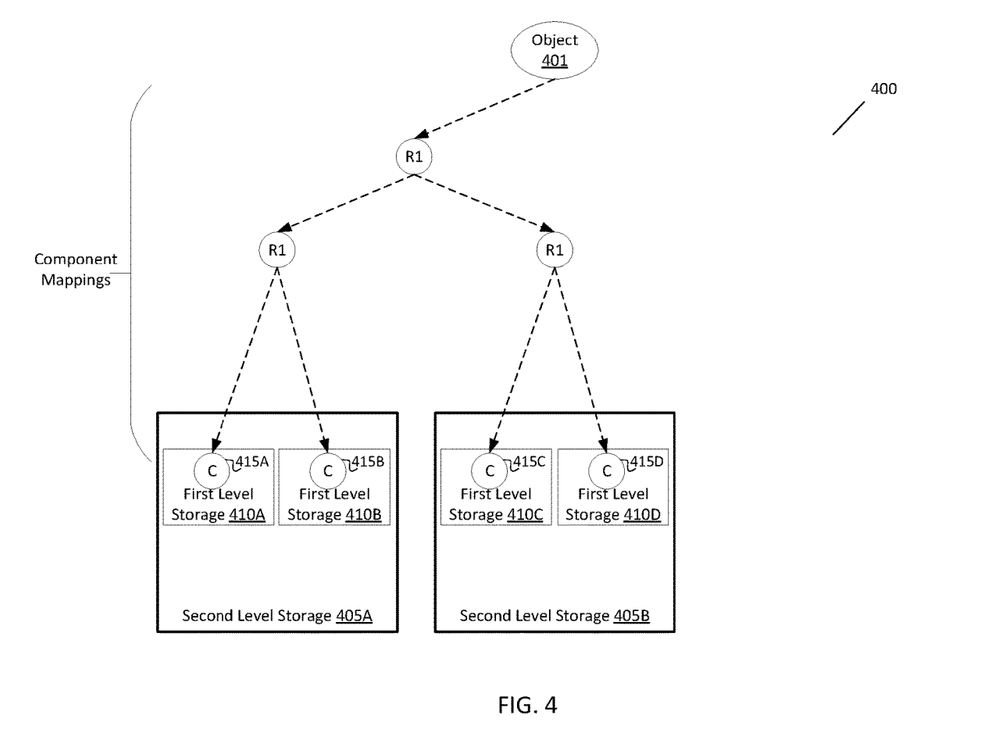
FIGS. 4-7 each illustrate an exemplary distribution of object components for a storage object in a distributed storage system.

This document describes embodiments that implement a method of managing storage objects and object components stored on a plurality of storage devices in a distributed storage system. Object components may be entire copies of a storage object, or object components may be stripes of a copy (e.g., broken up portions of a copy created by RAID 0) of a storage object. In some embodiments, the distributed storage system includes multiple levels of nested partitions of storage. In one embodiment, a second level of storage includes second partitions representing sites, and a first level of storage includes first partitions nested with the second partitions representing hosts. For example, a second level of storage is comprised of a plurality of sites, where each site includes one or more hosts making up a first level of storage. Referring to FIG. 4, second level storage 405A and 405B are examples of first partitions, and first level storage 410A and 410B are examples of second partitions nested within second level storage 405A.

In order to ensure that quorum is maintained when up to a first number of hosts and a second number of sites fail, embodiments are directed to determining a threshold number of hosts of the first level of storage required for each of a plurality of sites of the second level of storage to maintain a quorum for a first storage object across all of the sites. In response to determining that there are less than the threshold number of hosts, a quorum checker module adds a number of additional hosts to each of one or more sites to reach the determined threshold number of hosts required for each of the plurality of sites. The quorum checker module then adds a witness component to each of the additional hosts.

The quorum checker module further determines a number of votes to assign to each host to maintain the quorum when a failure of up to a first number of hosts and a second number of sites occurs. The determined number of votes are then allocated to each of the components of the first storage object and the added witness components within each host.

In some embodiments, the votes are distributed to the hosts based on rules that each host in the first level of storage within any particular sites have the same number of votes, and all sites have the same number of votes as any other site in the second level of storage, where an additional vote is distributed when the total number of votes is an even number. As a result, in the event of a failure of up to a first number of hosts and a second number of sites, quorum will be maintained for the storage object, and the storage object will remain accessible. In other embodiments, the first and second levels of storage represent any other two nested levels of storage. For example, the second level of storage may represent a host level and the first level of storage may represent a disk level.

Figure 1:
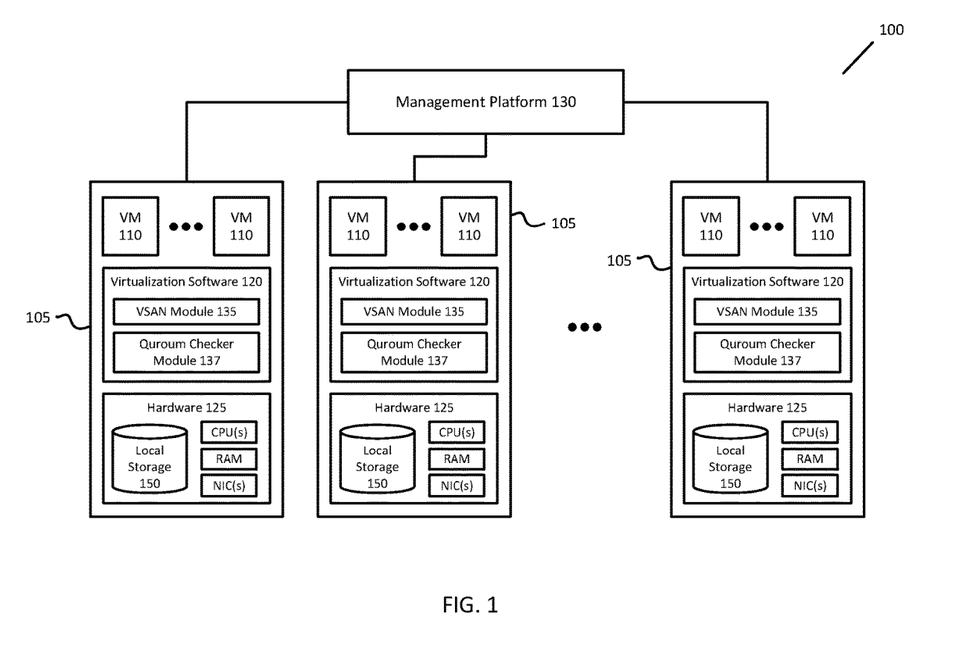
FIG. 1 illustrates, in block diagram form, an exemplary virtual data center environment including one or more networked processing devices configured to maintain a quorum for storage objects in the event of a failure of partitions of storage.

FIG. 1 illustrates, in block diagram form, exemplary computing environment 100, including one or more networked processing devices 105 configured to maintain a quorum for storage objects in the event of a failure of partitions of storage. Processing devices 105 may also be referred to within this document as nodes, computers, and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized computer, networking, storage, or security service (e.g., a firewall, webserver, database server, etc.). In one embodiment, computing environment 100 provides segregated server-based computing environments for multiple datacenter tenants. A datacenter tenant refers to a group of users that share common access with specific privileges. For example, the group of users may have common access to stored data objects, applications, etc. that users of another tenant may not access.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory.

One or more buses may be used to interconnect the various components of hardware 125. Additionally, the network interface controllers may be used to connect nodes 105, via a wired or wireless network, with one another.

Virtualization software 120 runs on hardware 125 of host server or node (e.g., a physical computer) 105. Virtualization software 120 manages VMs 110 and physical resources, such as hardware 125. Additionally, virtualization software 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105.

Management platform 130 is associated with nodes 105. Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130.

Local storage 150 housed in or otherwise directly attached to the nodes 105 may include combinations of solid-state drives (SSDs) and/or magnetic or spinning disks (MDs). As used in this document, the term "housed" or "housed in" may be used to encompass both housed in or otherwise directly attached storage. In some embodiments, SSDs serve as a read cache and/or write buffer in front of magnetic disks to increase I/O performance.

Each node 105 includes storage management or VSAN module 135 to automate storage management workflows and provide access to objects. Each VSAN module 135 (e.g., through an object management layer or submodule) communicates with other VSAN modules 135 of other nodes 105 to create and maintain an in-memory metadata database (e.g., maintained separately but in synchronized fashion in the memory of each node 105) that contains metadata describing the locations, configurations, policies, and relationships among the various objects stored in an object store. This in-memory metadata database is utilized by a VSAN module 135, for example, when an administrator first creates a virtual disk for a VM 110 as well as when the VM 110 is running and performing I/O operations (e.g., read or write) on the virtual disk. VSAN module 135 traverses a hierarchy of objects using the metadata in the in-memory database in order to properly route an I/O operation request to the node (or nodes) 105 that houses (house) the actual physical local storage that backs the portion of the virtual disk that is subject to the I/O operation.

Each node 105 includes quorum checker module 137. Quorum checker module 137 is configured to monitor distributed storage system 100, including the partitions of storage within distributed storage system 100. Quorum checker module 137 determines whether quorum can be maintained for a storage object stored in distributed storage system 100 based on fault tolerances for a first level of storage and a second level of storage. The fault tolerances define the number of first partitions in the first level of storage and the number of second partitions in the second level of storage that can fail, while still maintaining quorum. For example, when a fault tolerance for the first level of storage is defined as one, and a fault tolerance for the second level of storage is defined as one, quorum checker module 137 determines whether quorum can be maintained for a storage object when one first partition and one second partition, in addition to and separate from the first partition, fails. For example, where the second level of storage is comprised of a plurality of sites, and the first level of storage is comprised of a plurality of hosts nested within the plurality of sites, quorum can be maintained when up to one host and one site in addition to the one host, fails. In some embodiments, the fault tolerances for the first level of storage and the second level of storage are user-defined or established by default.

In some embodiments, quorum checker module 137 makes the determination when the storage object is initially stored in distributed storage system 100. In other embodiments, quorum checker module 137 makes the determination subsequent to the storage object being stored in distributed storage system 100. For example, quorum checker module 137 checks that quorum can be maintained in response to a modification to fault tolerances for the first level of storage and/or second level of storage.

In some embodiments, quorum checker module 137 initiates the addition of first partitions and second partitions to distributed storage system 100. In some embodiments, the addition of partitions includes quorum checker module 137 identifying first partitions and/or second partitions that are present within distributed storage system 100 but not associated with the storage object. In other embodiments, quorum checker module initiates the addition of new first partitions and/or second partitions to distributed storage system 100. Quorum checker module 137 further determines a number of total votes to allocate between the first partitions.

It will be apparent from this description that aspects of the inventions may be embodied, at least in part, in software. That is, the computer-implemented method 300 may be carried out in a computer system or other data processing system, such as nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in some embodiments, fewer components than that shown in FIG. 1 may also be used in nodes 105.

Figure 2:
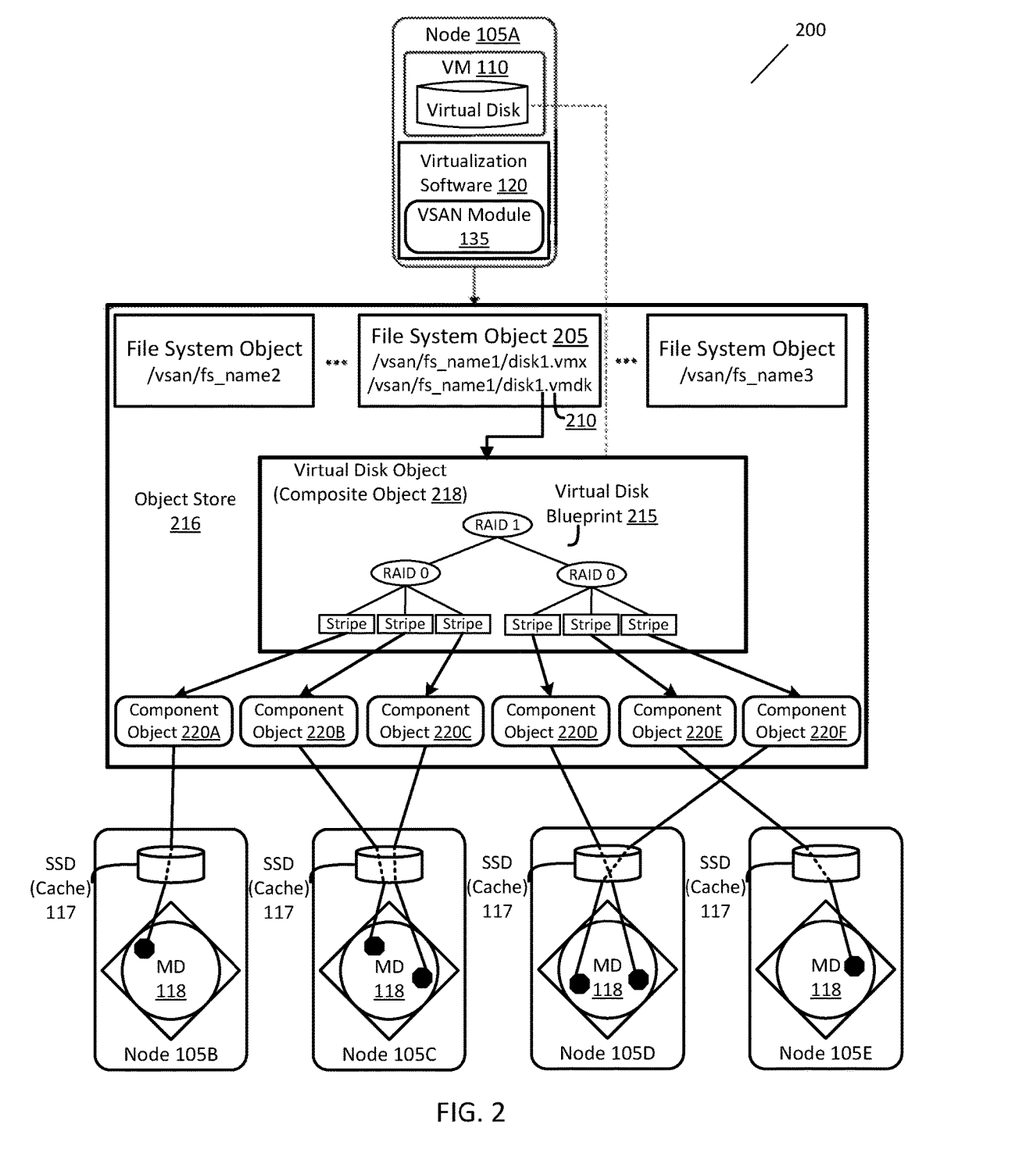
FIG. 2 illustrates an example hierarchical structure of objects organized within an object store that represents a virtual disk, according to one embodiment.

FIG. 2 illustrates an example hierarchical structure of objects organized within object store 216 that represent a virtual disk, according to one embodiment. As previously discussed above, a VM 110 running on one of nodes 105A-E may perform I/O operations on a virtual disk that is stored as a hierarchical or composite object 218 in object store 216. Virtualization software 120 provides VM 100 access to the virtual disk by interfacing with the VSAN module 135 (e.g., by auto-mounting the top-level file system object corresponding to the virtual disk object, in one embodiment). For example, VSAN module 135, by querying its local copy of the in-memory metadata database, is able to identify a particular file system object 205 (e.g., a VMFS file system object in one embodiment, etc.) that stores a descriptor file 210 for the virtual disk (e.g., a .vmdk file, etc.). It should be recognized that file system object 205 may store a variety of other files consistent with its purpose, such as virtual machine configuration files (e.g., .vmx files in a vSphere environment, etc.) and the like when supporting a virtualization environment. In some embodiments, each file system object may be configured to support only those virtual disks corresponding to a particular VM (e.g., a "per-VM" file system object).

Descriptor file 210 includes a reference to composite object 218 that is separately stored in object store 216 and conceptually represents the virtual disk (and thus may also be sometimes referenced herein as a virtual disk object). Composite object 218 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 218 includes a virtual disk blueprint 215 that describes a RAID 1 configuration where two mirrored copies of the virtual disk (e.g., mirrors) are each further striped in a RAID 0 configuration. Composite object 218 may thus contain references to a number of "leaf" or "component" objects 220A-220F corresponding to each stripe (e.g., data partition of the virtual disk) in each of the virtual disk mirrors. The metadata accessible by VSAN module 135 in the in-memory metadata database for each component object 220X (e.g., for each stripe) provides a mapping to or otherwise identifies a particular node 105X in a cluster that houses the physical storage resources (e.g., SSDs 117, magnetic disks 118) that actually store the stripe (as well as the location of the stripe within such physical resource).

In some embodiments, as the composite object 218 is mirrored and striped, using RAID 1 and RAID 0, respectively, to partitions of storage across different nodes 105B-105E, maintaining a quorum of the object components 220A-220F is needed to allow for continued accessibility of the object 218.

Figure 3:
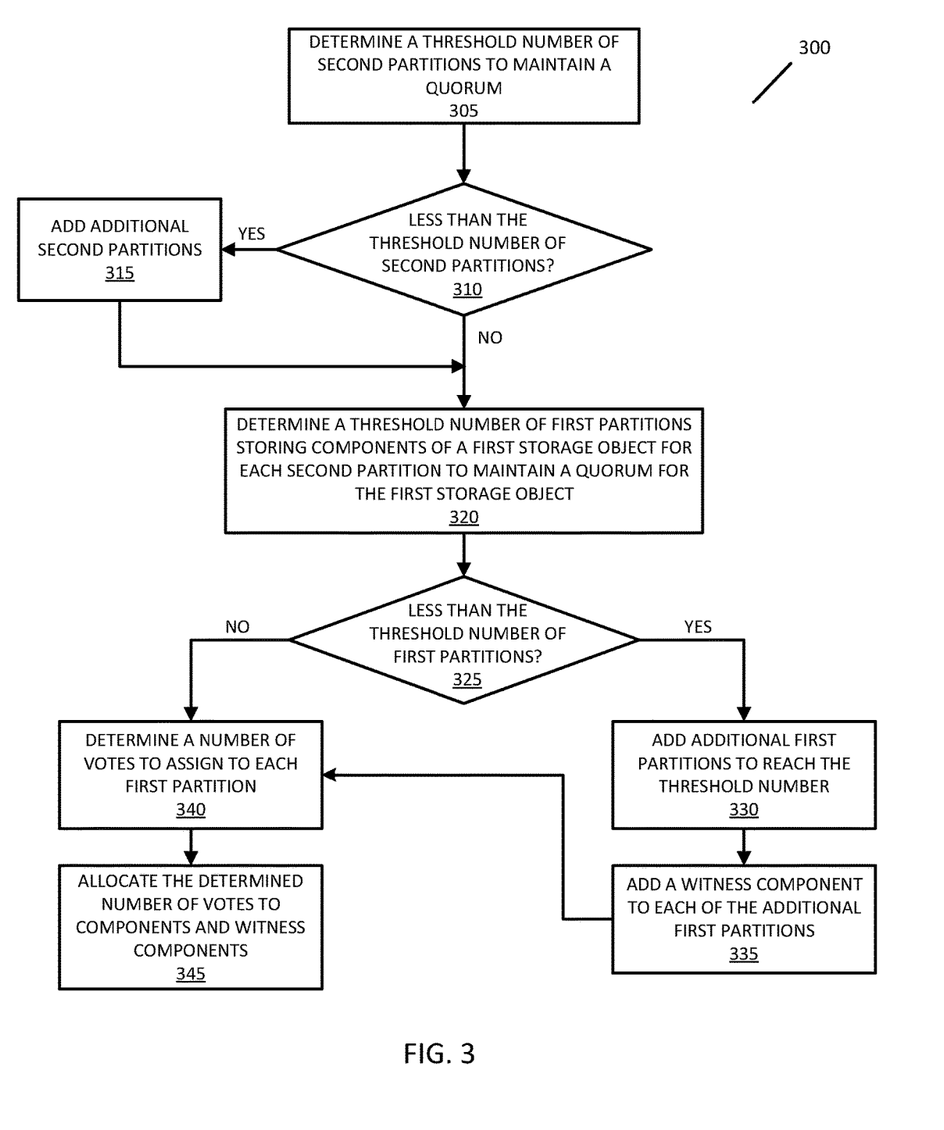
FIG. 3 is a flow chart illustrating an exemplary method of maintaining quorum of a storage object stored in nested levels of a distributed storage system.

FIG. 3 is a flow chart illustrating exemplary method 300 of maintaining quorum of a storage object stored in nested levels of storage of a distributed storage system. In some embodiments, each level includes one or more partitions. For example, as depicted in FIG. 4, distributed storage system 400 includes a first level of storage that includes one or more partitions of first level storage (410A-410D), or "first partitions." The partitions of first level storage are nested within a plurality of partitions of second level storage (405A and 405B) that comprise a second level of storage, or "second partitions." In some embodiments, each first level storage stores a component of a storage object or a witness component associated with the storage object, where the component is a copy of the storage object or a stripe of a copy of the storage object. There may be multiple components of the first storage object stored on one or more first partitions in the distributed storage system. Each component of the first storage object may include metadata and an object identifier indicating that the component is associated with a particular first storage object. The object identifier allows for accessing copies of the first storage object in response to I/O requests made to the distributed storage system.

As described above, quorum checker module 137 is configured to maintain a quorum for a storage object to allow the storage object to be accessible when there is a failure of a first number of first partitions of the first level (e.g., a first level of storage failures to tolerate) and a second number of second partitions of the second level (e.g., a second level of storage failures to tolerate). In one embodiment, the first number of first partitions and the second number of second partitions are defined by a user. In other embodiments, the first number of first partitions and the second number of second partitions are defined by default by distributed storage system 100.

At block 305, quorum checker module 137 determines a threshold number of second partitions of the second level of storage of a distributed storage system required to maintain the quorum for the first storage object. In one embodiment, quorum checker module 137 determines the threshold number of second partitions of the second level of storage by calculating the threshold number from a first sum of twice the second number of second partitions plus one. In this embodiment, the threshold number of first partitions is defined by the following formula:

Number of Second Partitions≥2$n$+1, where n is the second number of second partitions whose failures can be tolerated while quorum is maintained.

At block 310, quorum checker module 137 determines when there is less than the threshold number of second partitions. At block 315, in response to determining that there are less than the threshold number of second partitions of the second level, quorum checker module 137 adds second partitions to the second level to reach the threshold number of second partitions. In one embodiment, the one or more additional second partitions are already initialized and accessible within the distributed storage system. In other embodiments, the one or more additional second partitions are initialized and made accessible to quorum checker module 137. In one embodiment, quorum checker module 137 selects the additional second partitions from a plurality of available second partitions in the distributed storage system based on available resources of the plurality of available second partitions. When one of the plurality of available second partitions does not have enough resources for placing a component or witness component for the first storage object, the next available second partition with sufficient resources for placement of the component or witness component is selected for addition.

When there is at least the threshold number of second partitions, the method then proceeds to block 320 determine whether there are a threshold number of first partitions in each of the second partitions.

At block 320, quorum checker module 137 determines a threshold number of first partitions of a first level of storage required for each of a plurality of second partitions of a second level of storage to maintain a quorum for a first storage object across the second partitions. In one embodiment, quorum checker module 137 determines a threshold number of first partitions per second partition by first calculating a first value from a sum of twice the first number of first partitions plus one, and calculating a second value from a difference between a total number of second partitions and twice the second number of second partitions. The threshold number of first partitions per second partition is the quotient derived from a ceiling function of the division of the first value by the second value. In this embodiment, the threshold number of first partitions is defined by the following formula:

$$\text{Threshold Number of First Partitions per Second Parition} \geq \left\lceil \frac{2m+1}{T-2n} \right\rceil,$$

where m is the first number of first partitions, n is the second number of second partitions, and T is the total number of second partitions.

At block 325, quorum checker module 137 determines whether there are less than the threshold number of first partitions in each second partition. At block 330, in response to determining that at least one second partition does not include at least the threshold number of first partitions, quorum checker module 137 adds one or more additional first partitions such that each second partition has at least the threshold number of first partitions. In one embodiment, the one or more additional first partitions are already initialized and accessible within the second partition. In other embodiments, the one or more additional first partitions are initialized and made accessible to the quorum checker module 137.

At block 335, quorum checker module 137 adds a witness component to each of the one or more additional first partitions. In some embodiments, the witness components store the metadata for the first storage object and participate in voting, but do not include a component of the first storage object.

When quorum checker module 137 determines that there are at least the threshold number of first partitions in each second partition or after quorum checker module 137 adds the witness components to each of the one or more additional first partitions added to reach the threshold number of first partitions, the method proceeds to block 340. At block 340, quorum checker module 137 determines a number of votes to assign to each first partition to maintain the quorum when a failure of up to the first number of first partitions of the first level and the second number of second partitions of the second level occurs. For example, if the fault tolerance for the first number of first partitions is defined as 1, and the fault tolerance for the second number of second partitions of defined as 1, quorum checker module 137 determines the number of votes to assign to each first partition to maintain the quorum when can be maintained when up to one first partitions and one second partition fails. In some embodiments, quorum checker module 137 determines vote allocations such that each first partition has a same first number of votes as each other first partition and each second partition has a same second number of votes as each other second partition.

In one embodiment, to determine vote allocations, quorum checker module 137 determines, for each first partition k in second partition i, the total number of components and witness components, denoted as $C(i,k)$. Then, for each second partition, quorum checker module 137 determines the un-equalized votes for second partition i, $C(i)=LCM(C(i,k))*y_i$, where $LCM(C(i,k))$ is the least common multiple of all $C(i,k)$, $k=1 \ldots y_i$, where the value of $y_i$ is the total number of first partitions in a second partition i. The total votes across all second partitions, V, is calculated by $V=LCM(C(i))*x$, where $LCM(C(i))$ is the least common multiple of all $C(i)$, $i=1 \ldots x$, where the value of x is the total number of second partitions. The total votes, $V(i)$, for each second partition i is calculated by $V(i)=V/x$. For each first partition k in site i, its vote allocation is $V(i,k)=V(i)/y_k$.

At block 345, quorum checker module 137 allocates the determined number of votes to each of the components of the first storage object and the added witness components within each first partition. In some embodiments, when a combined number of votes for the components of the first storage object and the added witness components across all of the second partitions is an even number, quorum checker module 137 assigns an additional vote to one of the components of the first storage object or one of the added witness components. In one embodiment, the additional vote is assigned randomly. In other embodiments, other criteria may be used to determine the assignment of the additional vote, such as assigning the additional vote to the first level partition with the most amount of space.

When the determined number of votes has been allocated to each of the components of the first storage object and the added witness components, if up to the first number of first partitions of the first level and the second number of second partitions of the second level fail, quorum will be maintained for the first storage object when a first number of votes associated with the failed first partitions is less than a second number of votes associated with non-failed first partitions.

In some embodiments, if the failure of greater than the first number of first partitions and second number of second partitions occurs, even if there are components of the first storage object available on non-failed first partitions with the distributed storage system, the loss of quorum can occur from the lack of majority of votes by non-failed first partitions.

FIGS. 4-7 each illustrate an exemplary distribution of object components for a storage object in a distributed storage system.

FIG. 4 illustrates an exemplary distribution of object components for a storage object in distributed storage system 400. In FIG. 4, distributed storage system 400 includes a second level of storage that includes partition of second level storage 405A and partition of second level storage 405B. Partition of second level storage 405A includes partition of first level storage 410A and partition of first level storage 410B. Partition of second level storage 405B includes partition of first level storage 410C and partition of first level storage 410D. Partitions of first level storage 410A-410D comprise a first level of storage. In some embodiments, distributed storage system 400 includes additional second level storage partitions not depicted in FIG. 4. In some embodiments, partition of second level storage 405A and partition of second level storage 405B include additional first level storage partitions not depicted in FIG. 4. Storage object 401 includes four components, 415A, 415B, 415C, and 415D, distributed throughout distributed storage system 400. The components are denoted in FIG. 4 with a "C." In the embodiment depicted in FIG. 4, the components are copies of storage object 401 created through mirroring storage object 401 using RAID 1 (denoted by "R1"). Partition of first level storage 410A stores component 415A of storage object 401. Partition of first level storage 410B stores component 415B of storage object 401. Partition of first level storage 410C stores component 415C of storage object 401. Partition of first level storage 410D stores component 415D of storage object 401. The replication of storage object 401 and mappings between storage object 401 and the distributed components of the storage object 415A-415D are represented by directional broken lines.

Figure 5:
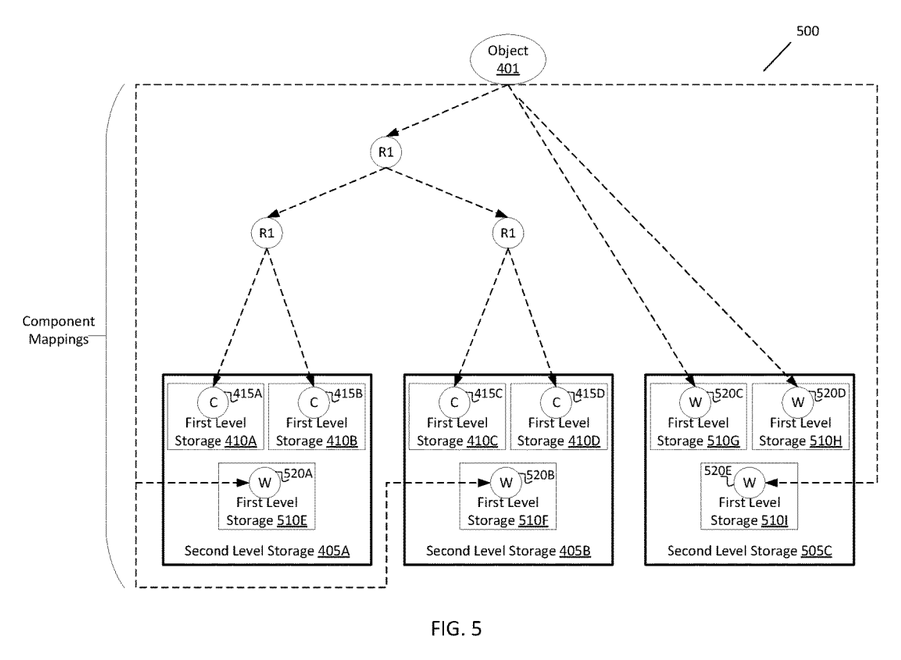

FIG. 5 illustrates an exemplary distribution of object components for a storage object in distributed storage system 500 as a result of quorum checker module 137 performing the methods described herein on the example distribution of object components depicted in FIG. 4.

Based on the example of FIG. 4, assuming that a value for the first level of storage failures to tolerate is defined as 1 and a value for the second level of storage failures to tolerate is defined as 1, using the formula described with respect to block 305 of FIG. 3, the minimum threshold number of second level storage partitions is 3. This results in quorum checker module 137 adding partition of second level storage 505C to distributed storage system 500. In one embodiment, partition of second level storage 505C is accessible for storage in distributed storage system 500 prior to quorum checker module 137 determining the need to add a second level storage partition. In other embodiments, partition of second level storage 505C is initialized and added to distributed storage system in response to quorum checker module 137 determining the need to add a second level storage partition.

Using the formula described with respect to block 320 of FIG. 3, the number of first level storage partitions for each second level storage partition is 3. This results in quorum checker module 137 adding additional partitions of first level storage 510E-510I to the distributed storage system 500. In one embodiment, one or more of additional partitions of first level storage 510E-510I are accessible for storage in distributed storage system 500 prior to quorum checker module 137 determining the need to add additional first level storage partitions. In other embodiments, additional partitions of first level storage 510E-510I are initialized and added to distributed storage system in response to quorum checker module 137 determining the need to add additional first level storage partitions. Quorum checker module 137 then adds witness components 520A-520E to additional partitions of first level storage 510E-510I, respectively. The added witness components are denoted in FIG. 5 with a "W." For example, witness component 520A is added to partition of first level storage 510E witness component 520B is added to partition of first level storage 510F, etc.

Quorum checker module 137 further determines a number of votes to assign to each of partitions of first level storage 410A-410D and 510E-510I. Using the formulas described with respect to block 340 of FIG. 3, quorum checker module 137 calculates the number of components and witness components in each first partition for each second partition. Referring to FIG. 5, there are x=3 second partitions 405A, 405B, and 505C, and y=3 first partitions in each of second partitions 405A, 405B, and 505C. For partition of second level storage 405A, the number of components and witness components are 1, 1, and 1, for partitions of first level storage 410A, 410B, and 510E, respectively. For partition of second level storage 405B, the number of components and witness components are 1, 1, and 1, for partitions of first level storage 410C, 410D, and 510F, respectively. For partition of second level storage 505C, the number of components and witness components are 1, 1, and 1, for partitions of first level storage 510G, 510H, and 510I, respectively. The least common multiple of 1, 1, and 1, and the value of LCM(C(i,k)) is 1. Using $C(i)=LCM(C(i,k))*y_i$, as each partition of second level storage 405A, 405B, and 505C has three first partitions (i.e., $y_i=3$), each partition of second level storage 405A, 405B, and 505C has 3 un-equalized votes. Using $V=LCM(C(i))*x$, where the least common multiple of 3, 3, and 3 is 3, multiplying the value of LCM(C(i)) by the total number of second partitions, 3, results in 9 total votes for allocation. Using $V(i)=V/x$, each second partition is allocated 3 votes of the 9 total votes. Each first partition within each second partition is allocated 1 vote of the 3 votes for each second partition based on $V(i)/y_k$. Thus, in this example, each partition of first level storage 410A-410D and 510E-510I in FIG. 5 would be assigned one vote. As the total number of votes, V, is an odd value, no additional votes are added.

Figure 6:
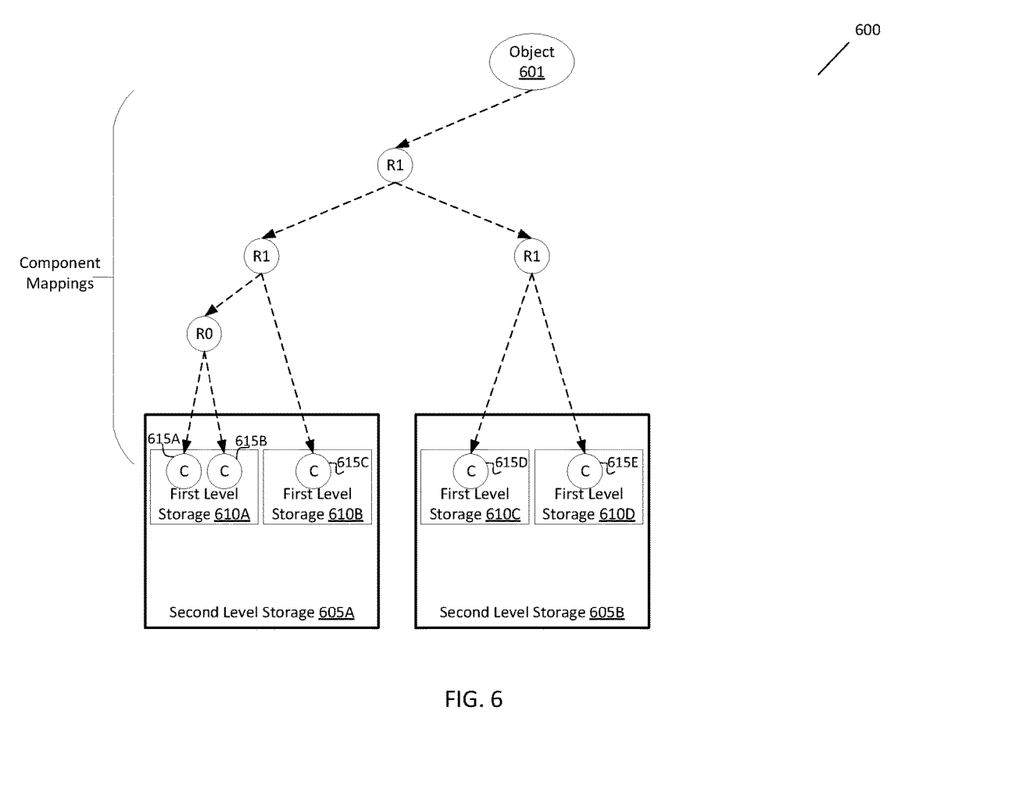

FIG. 6 illustrates an exemplary distribution of object components for a storage object in distributed storage system 600. In FIG. 6, distributed storage system 600 includes a second level of storage that includes partition of second level storage 605A and partition of second level storage 605B. Partition of second level storage 605A includes partition of first level storage 610A and partition of first level storage 610B. Partition of second level storage 605B includes partition of first level storage 610C and partition of first level storage 610D. Partitions of first level storage 610A-610D comprise a first level of storage. In some embodiments, distributed storage system 600 includes additional second level storage partitions not depicted in FIG. 6. In some embodiments, partition of second level storage 605A and partition of second level storage 605B include additional first level storage partitions not depicted in FIG. 6. Storage object 601 includes five components, 615A, 615B, 615C, 615D, and 615E distributed throughout distributed storage system 600. The components are denoted in FIG. 6 with a "C." In the embodiment depicted in FIG. 6, the components 615A and 615B are stripes of a copy of object 601 created through striping object 601 using Raid 0 (denoted by "R0"), and components 615C-615E are copies of storage object 401 created through mirroring storage object 401 using RAID 1 (denoted by "R1"). In this example, partition of first level storage 610A stores two components of storage object 601, component 615A and component 615B. Partition of first level storage 610B stores component 615C of storage object 601. Partition of first level storage 610C stores component 615D of storage object 601. Partition of first level storage 610D stores component 615E of storage object 601. In one embodiment, component 615A and 615B are stripes of a copy of storage object 601, and components 615C, 615D and 615E are copies of storage object 601. The replication of storage object 601 and mappings between storage object 601 and the distributed components of the storage object 615A-615E are represented by directional broken lines.

Figure 7:
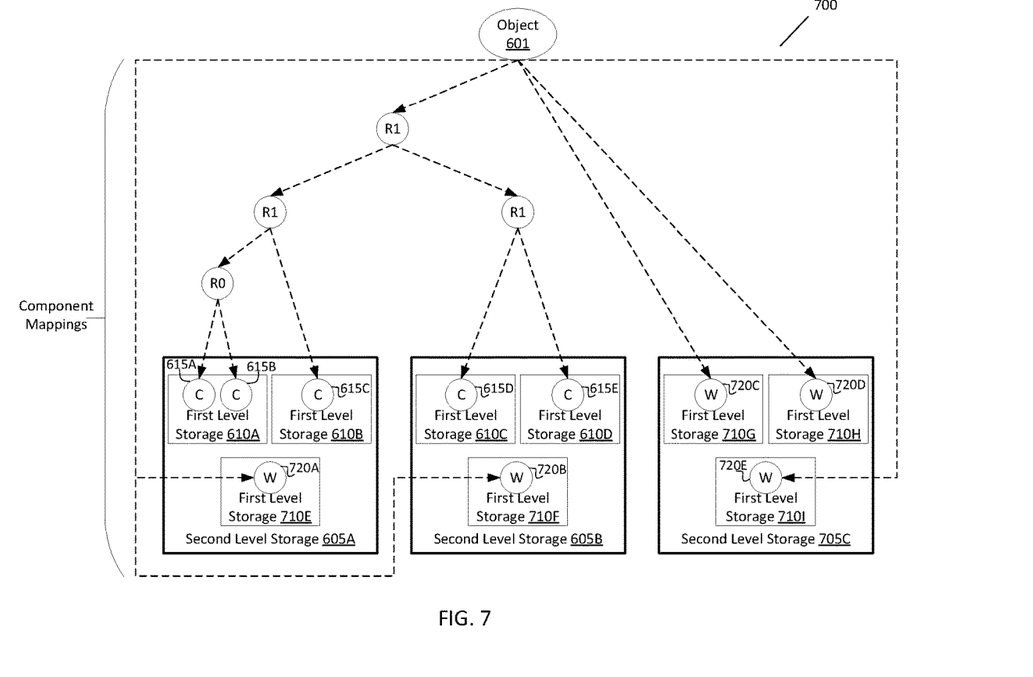

FIG. 7 illustrates an exemplary distribution of object components for a storage object in distributed storage system 700 following performance of the methods describes herein by quorum checker module 137 on the example distribution of object components depicted in FIG. 6.

Based on the example of FIG. 6, assuming that a value for the first level of storage failures to tolerate is defined as 1 and a value for the second level of storage failures to tolerate is defined as 1, using the formula described with respect to block 305 of FIG. 3, the minimum threshold number of second level storage partitions is 3. Using the formula described with respect to block 320 of FIG. 3, the number of first level storage partitions for each second level storage partition is 3. Following the example described in FIG. 4, quorum checker module 137 adds partition of second level storage 705C to distributed storage system 700, and adds additional partitions of first level storage 710E-710I amongst second level storage 605A, 605B, and 705C.

Quorum checker module 137 then adds witness components 720A-720E to additional partitions of first level storage 710E-710I, respectively. The added witness components are denoted in FIG. 7 with a "W." For example, witness component 720A is added to partition of first level storage 710E, witness component 720B is added to partition of first level storage 710F, etc. Quorum checker module 137 determines a number of votes to assign to each partition of first level storage 610A-610D and 710E-710I. In one embodiment, quorum checker module 137 assigns one vote to each first component and to each witness component.

Using the formulas described with respect to block 340 of FIG. 3, quorum checker module 137 calculates the number of components and witness components in each first partition for each second partition. Referring to FIG. 7, there are x=3 second partitions 605A, 605B, and 705C, and y=3 first partitions in each of the second partitions 605A, 605B, and 705C. For partition of second level storage 605A, the number of components and witness components are 2, 1, and 1, for partitions of first level storage 610A, 610B, and 710E, respectively. The least common multiple of 2, 1, and 1, and the value of C(i,k) for partition of second level storage 605A, is 2. For partition of second level storage 605B, the number of components and witness components are 1, 1, and 1, for partitions of first level storage 610C, 610D, and 710F, respectively. For partition of second level storage 705C, the number of components and witness components are 1, 1, and 1, for partitions of first level storage 710G, 710H, and 710I, respectively. The least common multiple of 1, 1, and 1, and the values of C(i,k) for partitions of second level storage 605B and 705C, are 1. The least common multiple of 2, 1, and 1, and the value of LCM(C(i,k)) is 2. Using $C(i)=LCM(C(i,k))*y_i$, as each partition of second level storage 605A, 605B, and 705C has three first partitions (i.e., $y_i=3$), each partition of second level storage 605A, 605B, and 705C has 6 un-equalized votes. Using $V=LCM(C(i))*x$, where the least common multiple of 6, 6, and 6 is 6, multiplying the value of LCM(C(i)) by the total number of second partitions, 3, results in 18 total votes for allocation. Using $V(i)=V/x$, each second partition is allocated 6 votes of the 18 total votes. Each first partition within each second partition is allocated 2 vote of the 6 votes for each second partition based on $V(i)/y_k$. Thus, in this example, each partition of first level storage 610A-610D and 710E-710I in FIG. 7 would be assigned two votes.

In some embodiments, when the combined number of votes across all second partitions of the second level of storage are even, an additional vote is randomly assigned to one of the first partitions. In this example, the combined number of votes across all second partitions, 605A, 605B, and 705C, is 18. As a result, quorum checker module 137 adds an additional vote to one of the components or witness components in distributed storage system 700, resulting in 19 total votes.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
determining a threshold number of first partitions of a first level of storage required for each of a plurality of second partitions of a second level of storage to maintain a quorum for a first storage object across the plurality of second partitions, each second partition of the plurality of second partitions including one or more of the first partitions, a plurality of the first partitions storing components of the first storage object across a plurality of storage devices in a distributed storage system, wherein each second partition corresponds to a storage site in the distributed storage system and each first partition corresponds to a host on a corresponding storage site;
adding one or more additional first partitions within each of one or more second partitions to reach the determined threshold number of first partitions required for each of the plurality of second partitions, wherein each of the one or more additional first partitions includes a witness component that participates in quorum voting for the first storage object but does not include a component of the first storage object;
determining a number of votes to assign to each first partition, including the one or more additional first partitions, to maintain the quorum when a failure of up to a first number of first partitions of the first level and a second number of second partitions of the second level occurs; and
allocating the determined number of votes to each of the components of the first storage object and to the witness components within each additional first partition, wherein voting by the components determines whether the quorum exists to access the first storage object.

2. The computer-implemented method of claim 1, wherein allocating the determined number of votes to each of the components of the first storage object and the witness components comprises:
assigning a number of votes to each first partition, including the one or more additional first partitions, such that each first partition has a same first number of votes as each other first partition and wherein each second partition has a same second number of votes as each other second partition.

3. The computer-implemented method of claim 2, further comprising:
assigning an additional vote to one of the components of the first storage object or one of the witness components when a combined number of votes for the components of the first storage object and the witness components across the second partitions is an even number.

4. The computer-implemented method of claim 1, further comprising:
determining that up to the first number of first partitions of the first level and the second number of second partitions of the second level have failed; and
determining that the quorum is maintained when a first number of votes associated with the failed first partitions is less than a second number of votes associated with non-failed first partitions, the first storage object being accessible when the quorum for the first storage object is maintained.

5. The computer-implemented method of claim 1, further comprising:
determining a threshold number of second partitions of the second level of storage of a distributed storage system required to maintain the quorum for the first storage object by calculating the threshold number of second partitions from a first sum of twice the second number of second partitions plus one.

6. The computer-implemented method of claim 5, further comprising:
determining that there are less than the threshold number of second partitions; and
in response to determining that there are less than the threshold number of second partitions of the second level, adding additional second partitions to the second level to reach the threshold number of second partitions.

7. The computer-implemented method of claim 1, wherein determining the threshold number of first partitions of the first level of storage required for each of the plurality of second partitions of the second level of storage to maintain the quorum for the first storage object across the second partitions comprises:
calculating a first value from a second sum of twice the first number of first partitions plus one;
calculating a second value of from a difference between a total number of second partitions and twice the second number of second partitions; and
calculating the threshold number of first partitions of the first level of storage by dividing the first value by the second value.

8. A non-transitory computer-readable medium storing instructions, which when executed by a processing device, cause the processing device to perform a method comprising:
determining a threshold number of first partitions of a first level of storage required for each of a plurality of second partitions of a second level of storage to maintain a quorum for a first storage object across the plurality of second partitions, each second partition of the plurality of second partitions including one or more of the first partitions, a plurality of the first partitions storing components of the first storage object across a plurality of storage devices in a distributed storage system, wherein each second partition corresponds to a storage site in the distributed storage system and each first partition corresponds to a host on a corresponding storage site;
adding one or more additional first partitions within each of one or more second partitions to reach the determined threshold number of first partitions required for each of the plurality of second partitions, wherein each of the one or more additional first partitions includes a witness component that participates in quorum voting for the first storage object but does not include a component of the first storage object;
determining a number of votes to assign to each first partition, including the one or more additional first partitions, to maintain the quorum when a failure of up to a first number of first partitions of the first level and a second number of second partitions of the second level occurs; and
allocating the determined number of votes to each of the components of the first storage object and to the witness components within each additional first partition, wherein voting by the components determines whether the quorum exists to access the first storage object.

9. The non-transitory computer-readable medium of claim 8, wherein allocating the determined number of votes to each of the components of the first storage object and the witness components comprises:

assigning a number of votes to each first partition, including the one or more additional first partitions, such that each first partition has a same first number of votes as each other first partition and each second partition has a same second number of votes as each other second partition.

10. The non-transitory computer-readable medium of claim 9, further comprising:

assigning an additional vote to one of the components of the first storage object or one of the witness components when a combined number of votes for the components of the first storage object and the witness components across the second partitions is an even number.

11. The non-transitory computer-readable medium of claim 8, further comprising:

determining that up to the first number of first partitions of the first level and the second number of second partitions of the second level have failed; and determining that the quorum is maintained when a first number of votes associated with the failed first partitions is less than a second number of votes associated with non-failed first partitions, the first storage object being accessible when the quorum for the first storage object is maintained.

12. The non-transitory computer-readable medium of claim 8, further comprising:

determining a threshold number of second partitions of the second level of storage of a distributed storage system required to maintain the quorum for the first storage object by calculating the threshold number of second partitions from a first sum of twice the second number of second partitions plus one.

13. The non-transitory computer-readable medium of claim 12, further comprising:

determining that there are less than the threshold number of second partitions; and in response to determining that there are less than the threshold number of second partitions of the second level, adding additional second partitions to the second level to reach the threshold number of second partitions.

14. The non-transitory computer-readable medium of claim 8, wherein determining the threshold number of first partitions of the first level of storage required for each of the plurality of second partitions of the second level of storage to maintain the quorum for the first storage object across the second partitions comprises:

calculating a first value from a second sum of twice the first number of first partitions plus one;

calculating a second value of from a difference between a total number of second partitions and twice the second number of second partitions; and calculating the threshold number of first partitions of the first level of storage by dividing the first value by the second value.

15. An apparatus comprising:
a processing device; and
a memory coupled to the processing device, the memory storing instructions which, when executed by the processing device, cause the apparatus to:

determine a threshold number of first partitions of a first level of storage required for each of a plurality of second partitions of a second level of storage to maintain a quorum for a first storage object across the plurality of second partitions, each second partition of the plurality of second partitions including one or more of the first partitions, a plurality of the first partitions storing components of the first storage object across a plurality of storage devices in a distributed storage system, wherein each second partition corresponds to a storage site in the distributed storage system and each first partition corresponds to a host on a corresponding storage site;

add one or more additional first partitions within each of one or more second partitions to reach the determined threshold number of first partitions required for each of the plurality of second partitions, wherein each of the one or more additional first partitions includes a witness component that participates in quorum voting for the first storage object but does not include a component of the first storage object;

determine a number of votes to assign to each first partition, including the one or more additional first partitions, to maintain the quorum when a failure of up to a first number of first partitions of the first level and a second number of second partitions of the second level occurs; and allocate the determined number of votes to each of the components of the first storage object and to the witness components within each additional first partition, wherein voting by the components determines whether the quorum exists to access the first storage object.

16. The apparatus of claim 15, wherein allocating the determined number of votes to each of the components of the first storage object and the witness components comprises:

assigning a number of votes to each first partition, including the one or more additional first partitions, such that each first partition has a same first number of votes as each other first partition and each second partition has a same second number of votes as each other second partition.

17. The apparatus of claim 16, wherein the instructions further cause the apparatus to:

assign an additional vote to one of the components of the first storage object or one of the witness components when a combined number of votes for the components of the first storage object and the witness components across the second partitions is an even number.

18. The apparatus of claim 15, wherein the instructions further cause the apparatus to:

determine a threshold number of second partitions of the second level of storage of a distributed storage system required to maintain the quorum for the first storage object by calculating the threshold number of second partitions from a first sum of twice the second number of second partitions plus one.

19. The apparatus of claim 18, wherein the instructions further cause the apparatus to:

determine that there are less than the threshold number of second partitions; and in response to determining that there are less than the threshold number of second partitions of the second level, adding additional second partitions to the second level to reach the threshold number of second partitions.

20. The apparatus of claim 15, wherein determining the threshold number of first partitions of the first level of storage required for each of the plurality of second partitions of the second level of storage to maintain the quorum for the first storage object across the second partitions comprises:
  calculating a first value from a second sum of twice the first number of first partitions plus one;
  calculating a second value of from a difference between a total number of second partitions and twice the second number of second partitions; and
  calculating the threshold number of first partitions of the first level of storage by dividing the first value by the second value.

\* \* \* \* \*